(12) United States Patent
Jovicevic

(10) Patent No.: US 7,488,026 B1
(45) Date of Patent: Feb. 10, 2009

(54) GUARD MEMBER FOR ADJUSTABLE SEAT IN A VEHICLE

(75) Inventor: Niko Jovicevic, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/966,298

(22) Filed: Dec. 28, 2007

(51) Int. Cl.
*B60N 2/16* (2006.01)

(52) U.S. Cl. .................................. 296/65.13
(58) Field of Classification Search ................ 248/424, 248/429; 296/65.01, 65.05, 65.09, 65.13
See application file for complete search history.

(56) References Cited

U.S. PATENT DOCUMENTS

| | | | |
|---|---|---|---|
| 2,965,156 A | | 12/1960 | Spencer |
| 5,039,166 A | * | 8/1991 | Kojho ..................... 297/344.1 |
| 5,242,143 A | | 9/1993 | Nagashima et al. |
| 5,664,755 A | * | 9/1997 | Gruber ....................... 248/424 |
| 6,347,778 B1 | * | 2/2002 | Koga et al. .................. 248/421 |
| 6,601,900 B1 | * | 8/2003 | Seibold .................... 296/65.09 |
| 6,616,230 B2 | * | 9/2003 | Niikura ...................... 297/311 |
| 7,029,063 B2 | * | 4/2006 | Holdampf .................... 297/15 |
| 2003/0116689 A1 | * | 6/2003 | Schuler et al. .............. 248/424 |
| 2006/0169863 A1 | * | 8/2006 | Ohtsubo et al. ............. 248/429 |
| 2007/0145224 A1 | * | 6/2007 | Yamada et al. .............. 248/429 |
| 2007/0194200 A1 | | 8/2007 | Toma et al. |

* cited by examiner

*Primary Examiner*—Glenn Dayoan
*Assistant Examiner*—Paul A Chenevert
(74) *Attorney, Agent, or Firm*—Young Basile

(57) ABSTRACT

A guard member for a seat installed on the floor of a vehicle and having an adjustment mechanism to move the seat up and down relative to the floor of the vehicle. The guard member includes a first segment fixed to a track mounted on the vehicle floor, an intermediate segment, and a second segment fixed to the seat. A first hinge pivotally couples the first segment to the intermediate segment and a second hinge couples the intermediate segment to the second segment. When the adjustment mechanism moves the seat up relative to the floor of the vehicle, the intermediate member prevents longitudinal access to a space between the raised seat and the floor.

19 Claims, 10 Drawing Sheets

US 7,488,026 B1

GUARD MEMBER FOR ADJUSTABLE SEAT IN A VEHICLE

FIELD OF THE INVENTION

The present invention pertains to the field of vehicle seats and more particularly to adjustable vehicle seats.

BACKGROUND

Motor vehicles typically have seats comprised of a seat bottom portion and a seat back portion operatively connected to the seat bottom portion. The seat may be adjusted along one or more axis, such as fore/aft (i.e., longitudinal with respect to the vehicle) and up/down (i.e., vertically with respect to the vehicle). Fore/aft adjustment is usually accomplished by a track comprised of a lower rail fixedly coupled to the vehicle floor and an upper rail coupled to the seat bottom and slidably coupled to the lower rail. The upper rail and seat translate along the lower rail to move the seat fore and aft. Up/down or vertical adjustment is usually accomplished by raising and lowering the seat relative to the upper rail. In many cases, the front and rear of a seat bottom are independently vertically adjustable, so that the front and rear of the seat may be positioned at different vertical locations. Additionally, many seats may also be tilted about a lateral axis.

When the seat is adjusted to its lowest vertical location, the lower portion of the seat bottom is proximal to the upper rail of the track. When the seat is adjusted to its highest vertical location, the lower portion of the seat bottom is spaced apart from the upper rail of the track. Thus, the distance between the lower portion of the seat bottom and the upper rail may vary as the seat is moved between the lowest and highest vertical locations.

It is known to provide decorative covers to visually hide a track of a seat from occupants located behind the seat, as disclosed in US Patent Application 2007/0194200. However, these decorative covers are lacking in various aspects, and thus a new assembly for a vertically adjustable seat is desirable.

SUMMARY

In one disclosed embodiment, a protective assembly is provided for a seat comprised of a seat back and a seat bottom. The seat is installed on a floor of a vehicle and has an adjustment mechanism to move the seat bottom vertically relative to the floor of the vehicle. The protective assembly includes a first segment fixed to a track; an intermediate segment; and a second segment fixed to the seat. A first hinge couples the first segment to the intermediate segment and a second hinge couples the intermediate segment to the second segment. When the adjustment mechanism moves the seat bottom up relative to the floor of the vehicle, at least a portion of the intermediate member is interposed between the seat and the floor of the vehicle to prevent access to a space between the seat bottom and the track. At least one of the first and second hinges includes a first hinge pin defining a hinge axis, and at least one ring forming an elongated slot having a longitudinal axis substantially perpendicular to the hinge axis. The first hinge pin is inserted through the at least one ring to permit the hinge axis to move translationally within the slot when the adjustment mechanism moves the seat vertically.

In another aspect of the disclosed embodiments, a seat assembly for a vehicle is provided. The seat assembly includes a seat having a seat back and a seat bottom; a track having a lower rail fixed to the floor of the vehicle, an upper rail slidably coupled to the lower rail, and a seat mounting bracket; a vertical adjustment mechanism mounted to the upper rail and the seat bottom and configured to move the seat bottom up and down relative to the rail; and a guard member. The guard member has a first segment fixed to one of the vehicle floor and the track, a second segment fixed to the seat bottom, and an intermediate segment. The guard member also has a first hinge pivotally coupling the first segment to the intermediate segment and a second hinge pivotally coupling the intermediate segment to the second segment. At least one of the first and second hinges includes a hinge pin defining a hinge axis, and at least one ring defining an elongated slot having a longitudinal axis that is substantially perpendicular to the hinge axis. The hinge pin is inserted through the slot to permit the hinge axis to move translationally along the elongated slot.

In another aspect of the disclosed embodiments, a seat assembly for a vehicle is provided. The seat assembly includes a seat having a seat back and a seat bottom; a track having a lower rail fixed to the floor of the vehicle, an upper rail slidably coupled to the lower rail, and a seat mounting bracket; a vertical adjustment mechanism mounted to the upper rail and the seat bottom and configured to move the seat bottom up and down relative to the rail; and a guard member. The guard member has a first segment fixed to one of the vehicle floor and the track, a second segment fixed to the seat bottom, and an intermediate segment. The guard member also has a first hinge pivotally coupling the first segment to the intermediate segment and a second hinge pivotally coupling the intermediate segment to the second segment. The intermediate member is configured and arranged to span the distance between the seat bottom and the track to prevent access to a space between the seat bottom and the track.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
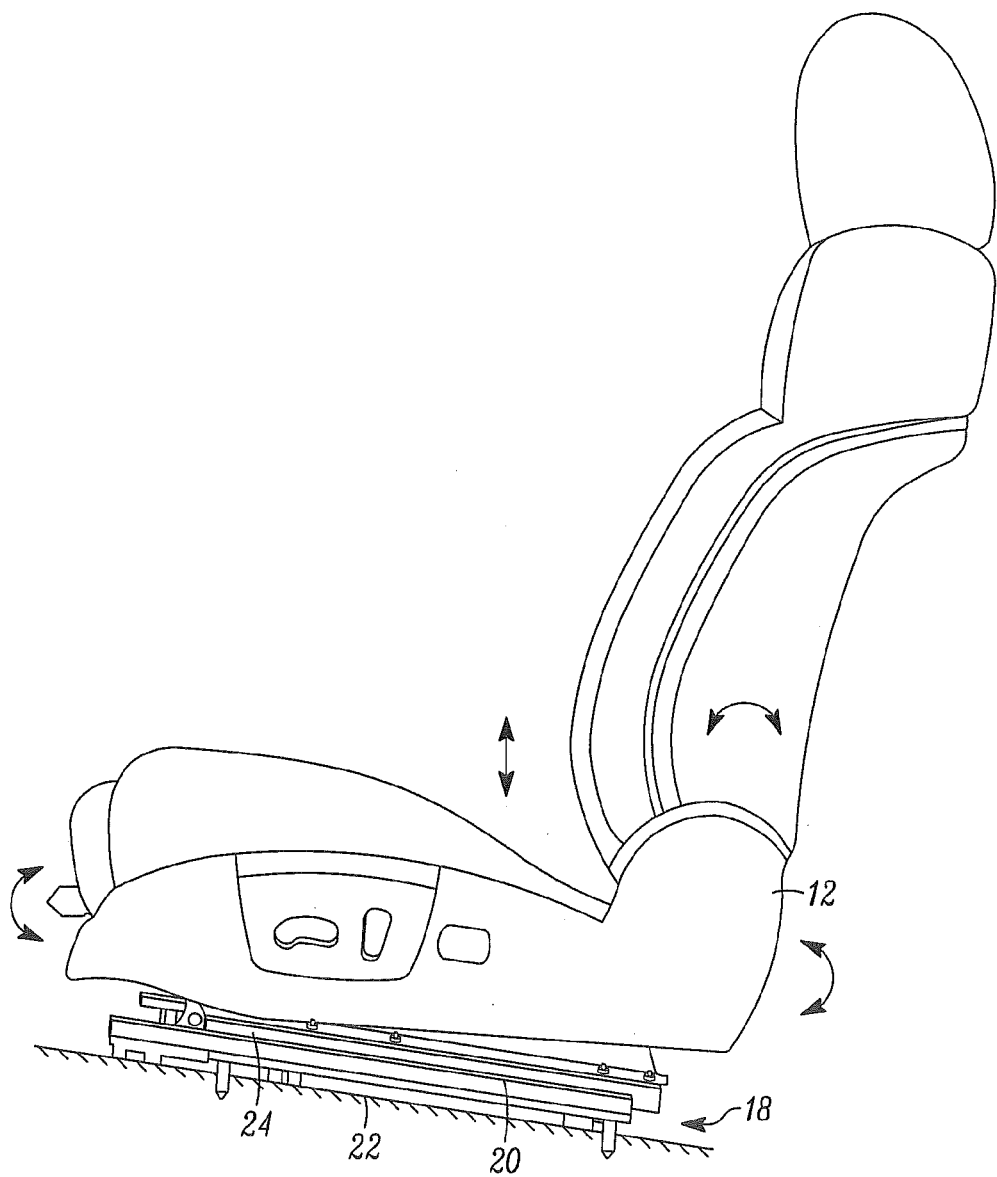
FIG. 1 is diagram of a seat in a motor vehicle showing the directions that the seat can be adjusted.

FIGS. 1-12 illustrate a protective assembly 10, also called a guard member, that can be installed on a seat 12 of a vehicle. Many modern vehicle seats, as illustrated in FIG. 1, can move in multiple directions, including fore/aft and up/down, and have the ability to tilt. The support structure of the seat 12 includes a track 18 including a lower rail 20 fixed to the floor 22 of the vehicle, and an upper rail 24 slidably coupled to the lower rail 20.

Figure 2:
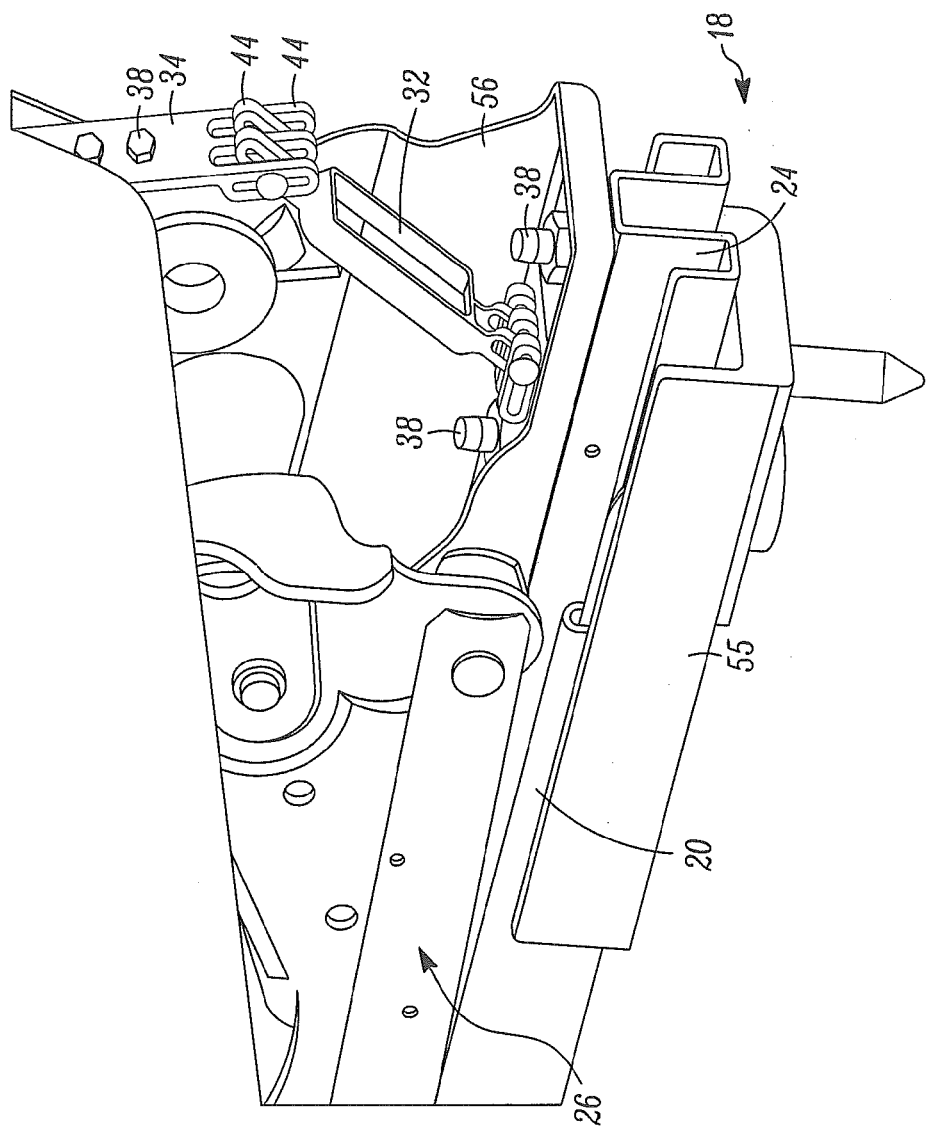
FIG. 2 is a perspective view of a horizontal adjustment mechanism.

As shown in FIG. 2, the track 18 includes a lower rail 20, an upper rail 24 slidably coupled to the lower rail 20, and a seat mounting bracket 56 mounted to the upper rail 24. The lower rail 20 can include a floor mounting bracket 55, which can be a separate piece fixed to the lower rail 20 or a piece formed integrally with the lower rail 20. The lower rail 20 can be U-shaped, and can include two spaced-apart, upright hook-shaped edges to accept the upper rail 24. Depending on the shape of the upper rail 24, other types of grooves or tracks can be used in place of the hook-shaped portions. The upper rail 24 can include two upright end walls configured and arranged to slide into the hook-shaped portions of the lower rail 20. Alternatively, the upper rail 24 can include a projecting strip or other structure to permit a slidable engagement with the lower rail 20. The seat mounting bracket 56 can be fixed to or formed integrally with the upper rail 24 in order to provide a connection point for a joint of a vertical adjustment mechanism 26. Fewer, additional, or alternative brackets and members can be included as are necessary. Fore/aft (i.e., horizontal) movement of the seat 12 can be accomplished by translating the upper rail 24 relative to the lower rail 20. To achieve this movement, a motor can operate through a transmission to slide the upper rail 24 relative to the lower rail 20. Alternatively, pneumatic cylinders or a rack and pinion system can be used to move the lower rail 20 relative to the upper rail 24. Or, a passenger can manually disengage a fixed coupling between the upper rail 24 and lower rail 20 using a hand lever, move the upper rail 24 relative to the lower rail 20, and then reengage the hand lever to prevent relative movement between the rails 20, 24.

Figure 3:
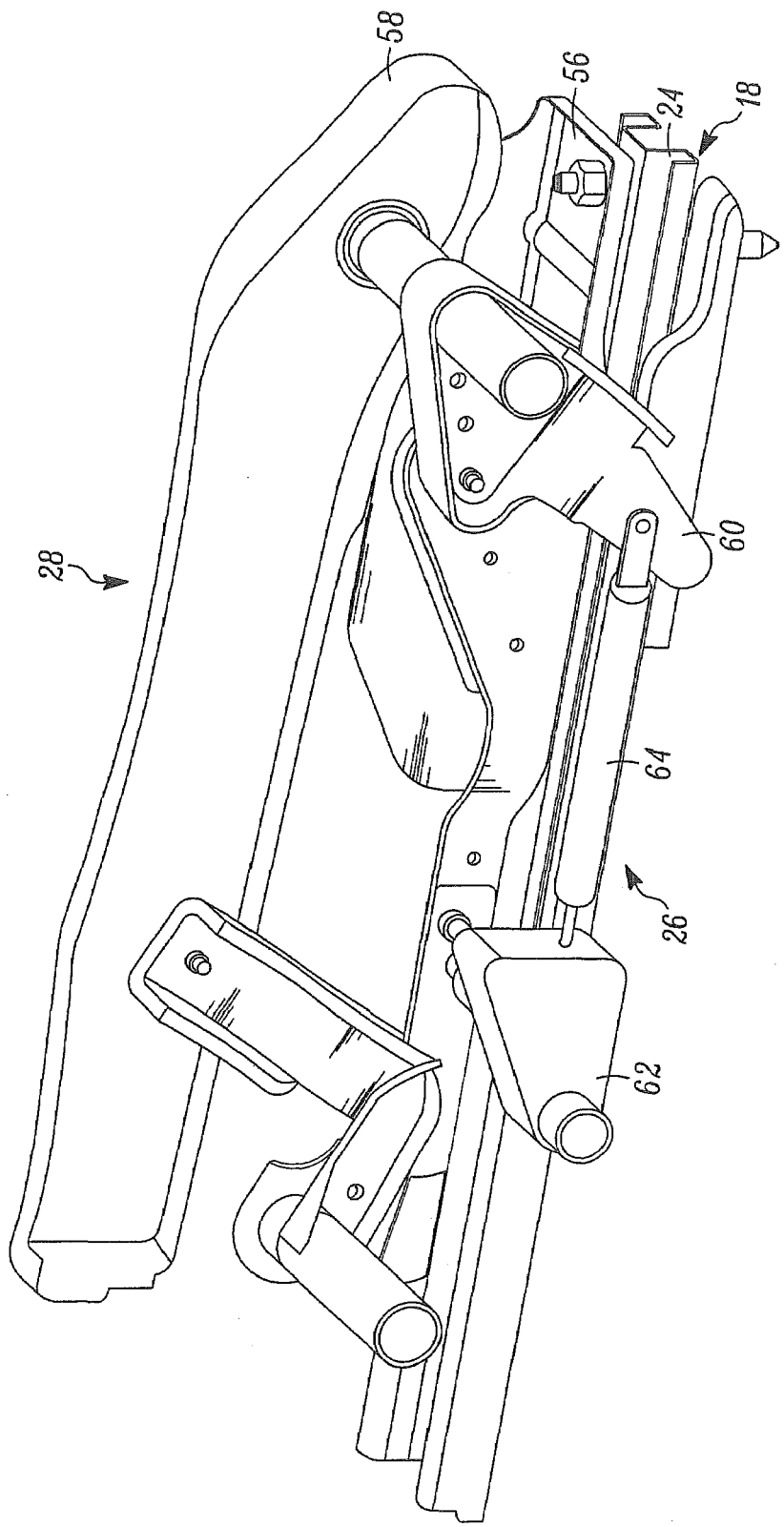
FIG. 3 is a perspective view of a vertical adjustment mechanism.

FIG. 3 illustrates an embodiment including a vertical adjustment mechanism 26 to adjust the rear portion of the seat 12. As illustrated in FIG. 3, at least one vertical adjustment mechanism 26 connects the track 18 to the frame 28 of the seat 12. The frame 28 can include a seat bottom side member 58 and a rear pivot bracket 60, with the rear pivot bracket 60 being rotatably coupled to the seat mounting bracket 56 on the upper rail 24. Fewer, additional, or alternative brackets and members can be included as are necessary. Up/down (i.e., vertical) movement of the seat 12 can be accomplished using vertical adjustment mechanisms 26. The vertical adjustment mechanism 26 as illustrated includes a transmission 62 and a rod 64 running from the transmission 62 to the rear pivot bracket 60. The rod 64 can be moved fore/aft by the transmission 62 to pivot the rear pivot bracket 60, which in turn can be rotatably coupled to the frame 28 of the seat 12 to raise or lower the seat 12. The vertical adjustment mechanism 26 as illustrated raises and lowers the rear portion of the seat 12. A second vertical adjustment mechanism 26 can be provided to raise and lower the front of the seat 12. Alternative vertical adjustment mechanisms 26 can be used in place of the transmission 62 and rod 64 system. For example, pneumatic cylinders, or a vertical rack and pinion system, can be attached to the upper rail 24 and the frame 28 of the seat 12. Multiple independently operable vertical adjustment mechanisms 26 can be attached between the track 18 and the frame 28 of the seat 12 at various fore/aft positions along the seat 12 to permit tilting the seat 12. Vertical adjustment and tilting of the seat 12 can create a space between the track 18 and the frame 28 of the seat 12. The present protective assembly 10 can be attached to the track 18 and the seat 12 to prevent the insertion of a body part of a passenger or other object into the space.

Figure 4:
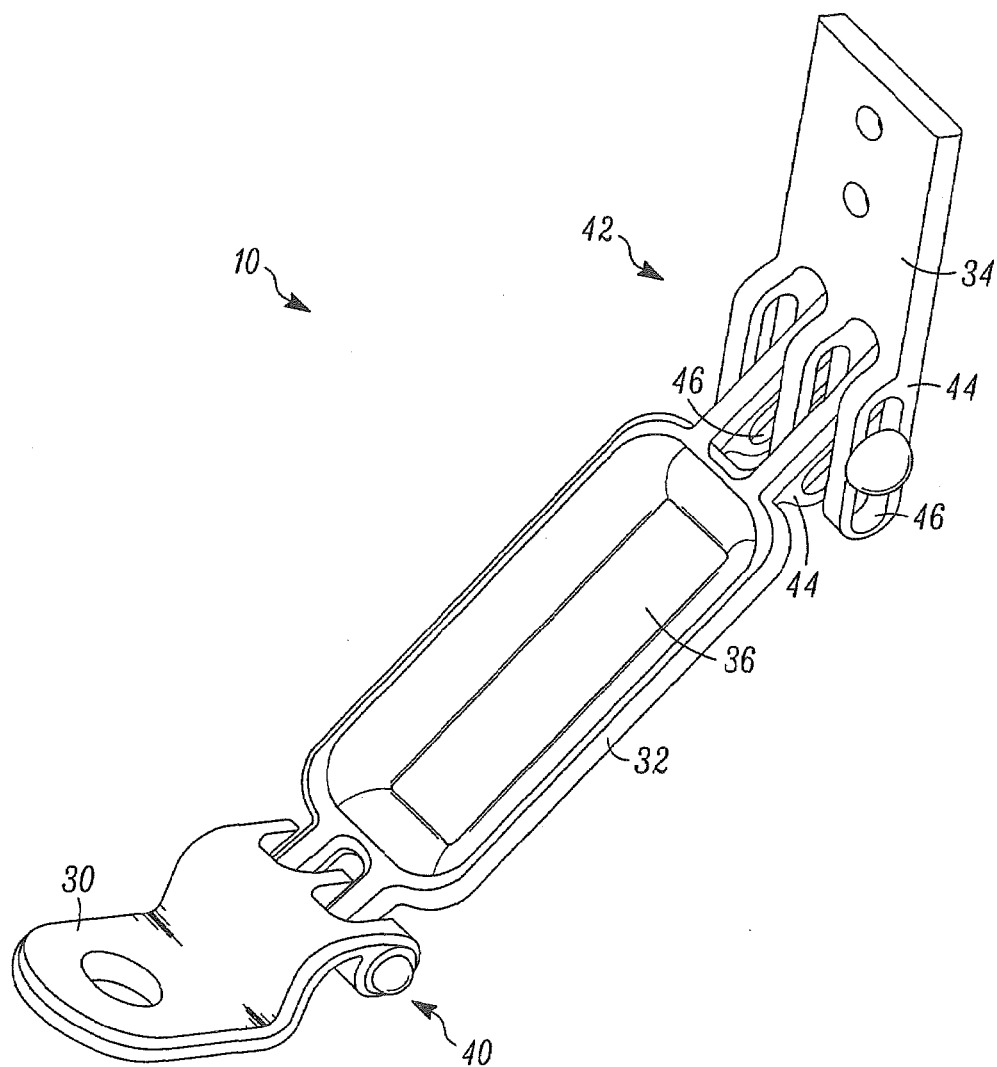
FIG. 4 is a perspective view of a guard member.

As illustrated in FIG. 4, the protective assembly 10 includes a first segment 30, an intermediate segment 32, and a second segment 34. To prevent the protective assembly 10 from limiting the range of motion of the seat 12, the intermediate segment 32 can be long enough to span the distance between the track 18 and the seat 12 when the seat is adjusted to its highest vertical position. The intermediate segment 32 can include an aperture 36 so as not to contact any fasteners 38 on the track 18 when the seat 12 is in its lowest position. If no fastener 38 can contact the intermediate segment 32 throughout the range of motion of the segment 32, no aperture 36 is necessary. The first segment 30 is coupled to the intermediate segment 32 by a first hinge 40 to permit the intermediate segment 32 to rotate relative to the first segment 30. Likewise, the second segment 34 is coupled to the intermediate segment 32 by a second hinge 42 to permit the intermediate segment 32 to rotate relative to the second segment 34. The first hinge 40 and the second hinge 42 can be located where the ends of the segments 30, 32, 34 meet. The hinges 40, 42 can be formed integrally with the segments 30, 32, 34, or the hinges 40, 42 can be formed separately from and be fixed to the segments 30, 32, 34.

As illustrated, the intermediate segment 32 and the second segment 34 each include a plurality of rings 44 enclosing elongated slots 46. The rings 44 can be spaced apart so that the rings 44 on the intermediate segment 32 fit between the rings 44 on the second segment 34. The rings 44 as illustrated are located on the hinged ends of the second and intermediate segments 32, 34. While the rings 44 are included as part of the second hinge 42 in FIG. 4, rings 44 can alternatively be included as part of the first hinge 40. Moreover, rings 44 can be included at both hinges 40, 42. For example, the first segment 30 can include rings 44 as part of the first hinge 40, and the intermediate segment 32 can include rings 44 as part of the second hinge 42. Furthermore, two sets of rings 44 are not necessary; the protective assembly 10 can include just one set of rings 44 located, for example, at one end of the intermediate segment 32 or at the hinged end of one of the first and second segments 30, 32. Also, while a plurality of rings 44 are illustrated, one ring 44 can suffice to hold two of the segments 30, 32, 34 together and permit the necessary movement of the seat 12. The first hinge 40 is illustrated as a hinge that allows only one rotational degree of freedom, i.e., the hinge 40 does not permit the hinge pin 52 to translate. If the hinge 40 includes rings 44, the intermediate segment 32 has a greater range of motion, which permits the seat 12 to have a greater range of adjustability if the protective assembly 10 limits the adjustability of the seat 12 in any way. In other words, including rings 44 allows the hinge 40 to have a rotational degree of freedom, but also translational degrees of freedom along the length of the rings 44.

Figure 5:
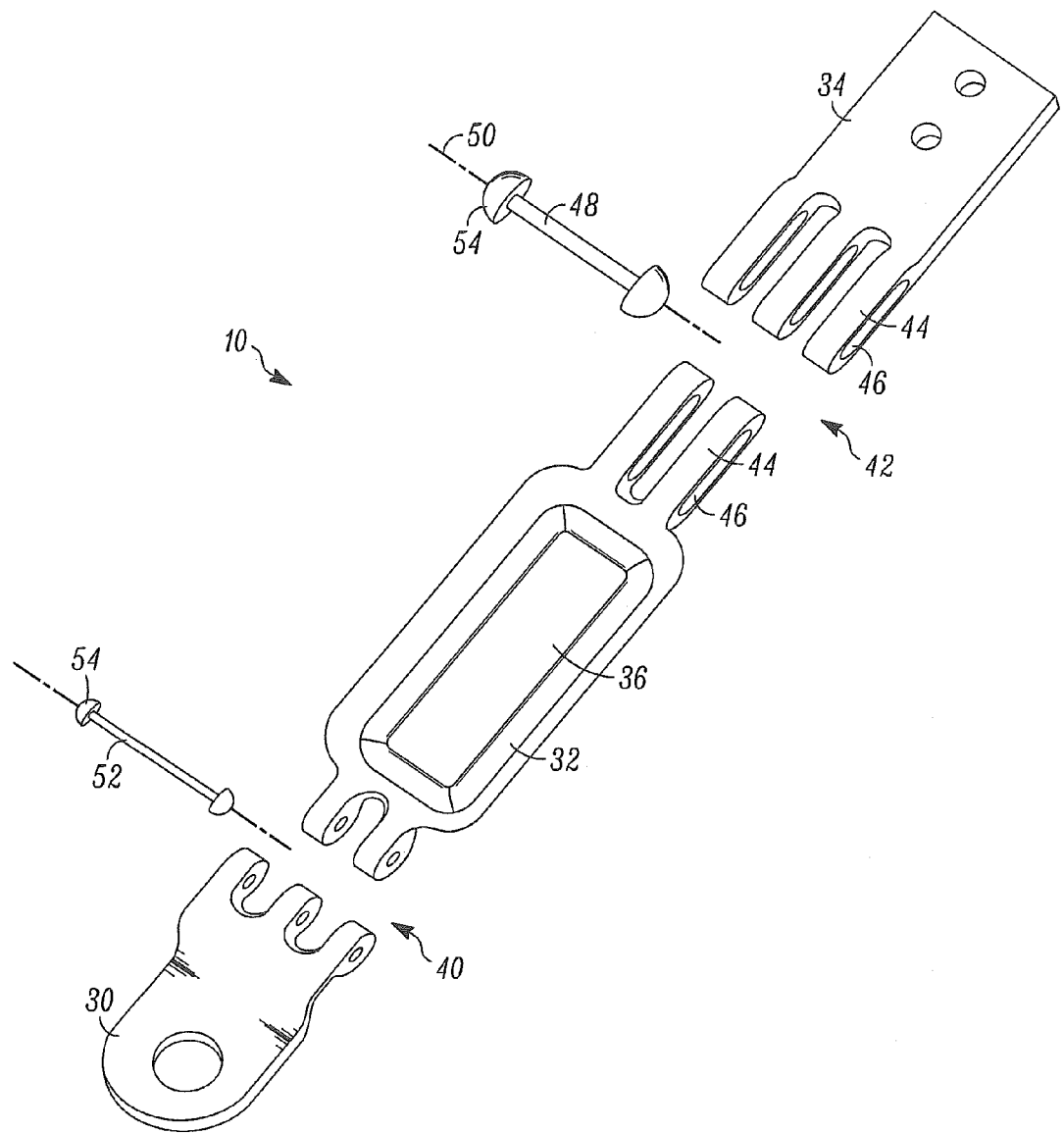
FIG. 5 is an exploded perspective view of the guard member of FIG. 4.

FIG. 5 illustrates an exploded view of the protective assembly 10. A first hinge pin 48 can be inserted through the rings 44 of a hinge, illustrated as the second hinge 42 in FIG. 5. The first hinge pin 48 can also be used in the first hinge 40 if the first hinge 40 includes at least one ring 44. The axis of the first hinge pin 48 defines a moveable hinge axis 50. If both hinges 40, 42 include rings 44, two separate first hinge pins 48 define two moveable hinge axes 50. As illustrated, however, a second hinge pin 52 is inserted through the first hinge 40.

The intermediate segment 32 can be made of a rigid material, such as steel, aluminum, plastic, a composite, or any other materials understood to be acceptable by those skilled in the art when this description is read in conjunction with viewing the accompanying drawings. The first and second segments 30, 34 can be made of the same material as the intermediate segment 32. Alternatively, the first and second segments 30, 34 can be made of a different material than each other and/or the intermediate segment 32.

The pins 48, 52 can be made of steel, plastic, or any other materials understood to be acceptable by those skilled in the art when this description is read in conjunction with viewing the accompanying drawings. The pins 48, 52 can include securing devices 54 at their ends to ensure the pins 48, 52 remain in the hinges 40, 42. For example, each pin 48, 52 can have a first bulbous end and a second end with a groove to receive a C-clip. Alternatively, each pin 48, 52 can function as a bolt, and a nut can be attached to secure the pin. If one pin 52 is part of a hinge without rings 44, the pin 52 can be formed integrally with one segment 30, 32, 34, in which case the adjoining segment 30, 32, 34 includes C-shaped snap-on projections to complete the hinge. Or, the securing devices 54 can be mushroom head-type securing devices fixed to the ends of the pins 48, 52 that are installed by forcing one mushroom head through a hinge. Once the head is through the hinge, one head is on each side of the hinge to prevent the pin 48, 52 from coming loose.

Figure 6:
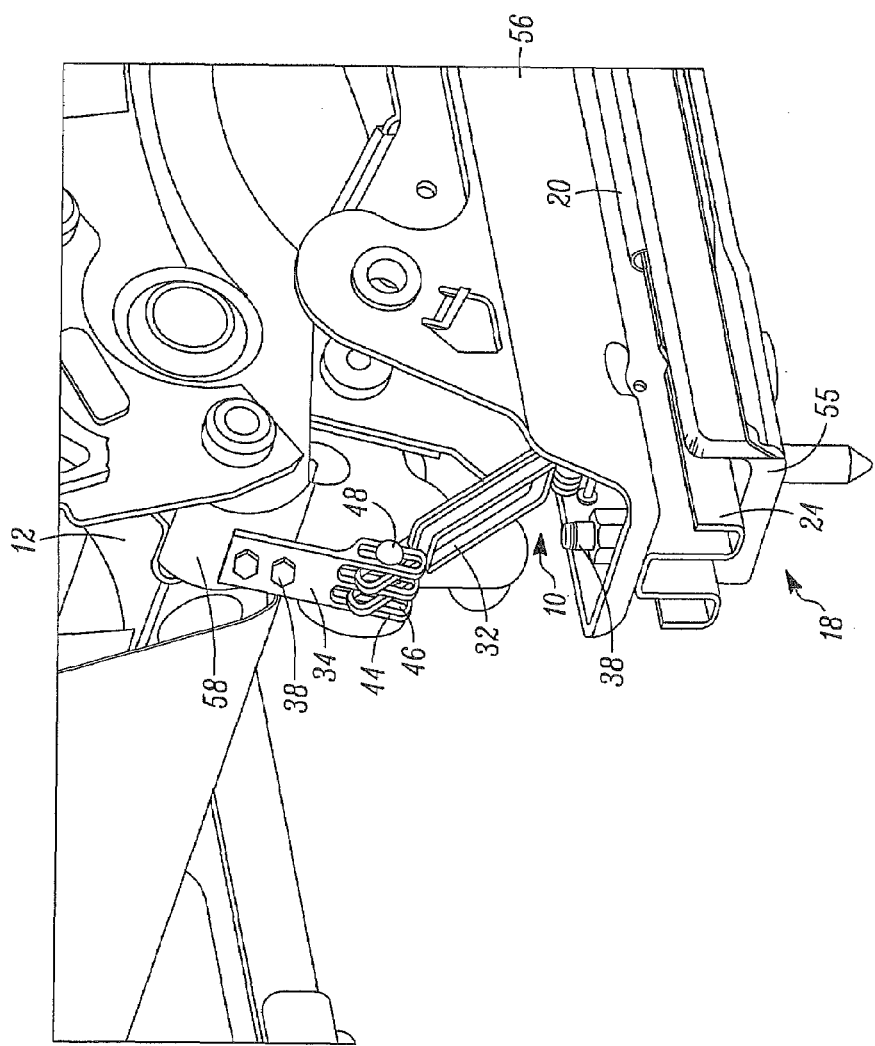
FIG. 6 is a perspective view of the guard member of FIG. 4 installed on a seat that is adjusted to its highest vertical position.
Figure 7:
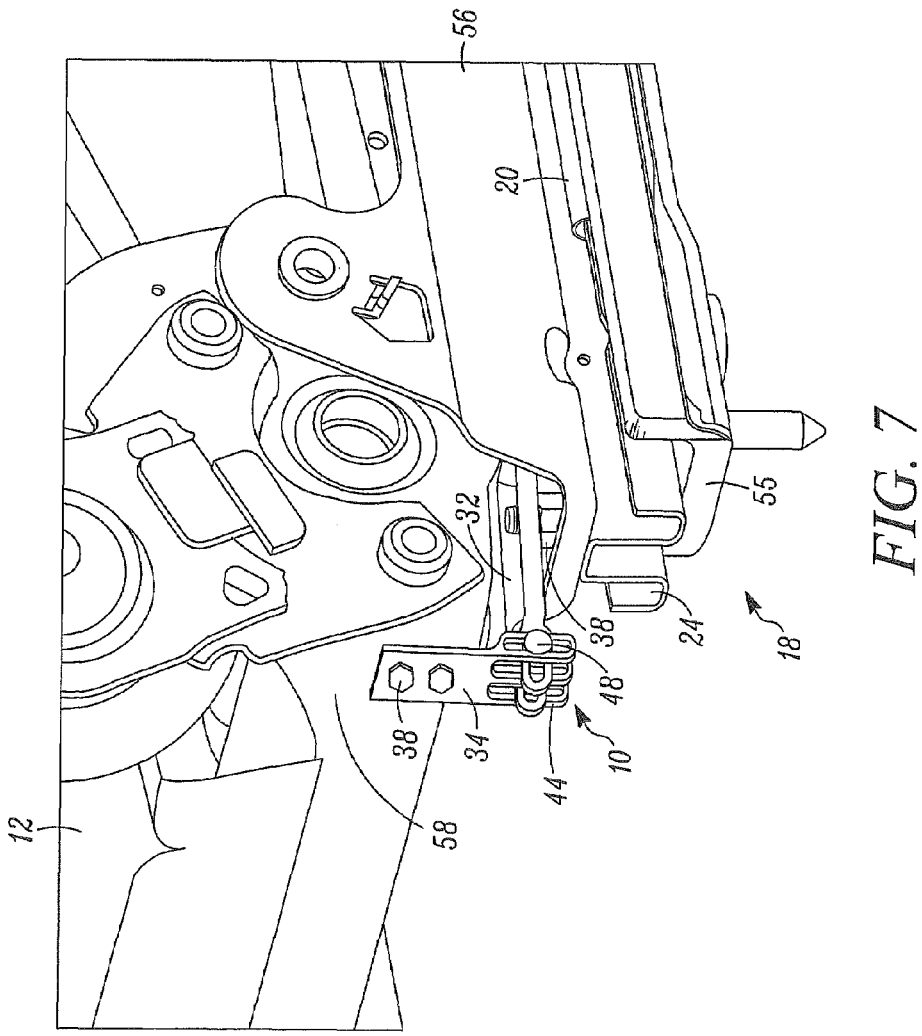
FIG. 7 is a perspective view of the guard member of FIG. 4 installed on a seat that has been adjusted to its lowest vertical position.

In operation, the protective assembly 10 can be fixed to the track 18 and the seat 12 as illustrated in FIGS. 6 and 7. The first segment 30 can be fixed to a part of the track 18, such as the seat mounting bracket 56 as illustrated in FIG. 6. Alternatively, the first segment 30 can be fixed to the lower rail 20, the floor 22, the upper rail 24 or other suitable structures that are attached to the track 18. The second segment 34 can be fixed to seat bottom side member 58 of the seat 12. The second segment 34 can alternatively be fixed to a different part of the frame 28 of the seat 12, part of the vertical adjustment mechanism 26 such as the rear pivot bracket 60, or another suitable structure attached to the seat 12. The intermediate segment 32 extends between the first segment 30 and the second segment 34, and as a result the intermediate segment 32 is interposed between the track 18 and the seat 12 to prevent access to a space between the seat 12 and the upper rail 24.

FIG. 6 illustrates the seat 12 in the highest position permitted by the structure of the seat 12 and the track 18 and the vertical adjustment mechanisms 26. FIG. 7, on the other hand, illustrates the seat 12 in the lowest position permitted by the structures of the seat 12 and the track 18 and the vertical adjustment mechanisms 26. As the seat 12 travels between the positions illustrated in FIGS. 6 and 7, the intermediate segment 32 can rotate relative to the first and second segments 30, 34. Additionally, the first hinge pin 48 can translate through the elongated slots 46 enclosed by the rings 44, as illustrated by the arrows indicating the possible direction of travel of the pin 48 in FIG. 11. The movement of the first hinge pin 48, and therefore of the hinge axis 50 defined by the first hinge pin 48, permits the seat 12 to be moved to a variety of horizontal and vertical combinations.

Without the rings 44, the intermediate segment 32 would only be able to rotate, in which case the position of the first hinge pin 48 would be limited to an arc having its center at the first hinge 40. By including the rings 44, the range of motion of the seat 12 is greatly improved. For example, the protecting mechanism 10 permits the seat 12 to move further back horizontally from the position illustrated in FIG. 7 without altering the vertical height of the seat 12, as illustrated by the arrows indicating the possible direction of travel of the pin 48 in FIG. 12. Likewise, the protecting mechanism 10 permits the seat to move forward horizontally from the position illustrated in FIG. 7 without changing the height of the seat 12. Without the rings 44, the seat 12 would have to be raised vertically in order to move forward. Even if only the intermediate segment 32 includes rings 44, the range of motion of the seat 12 is improved compared to a hinge without rings 44. Moreover, though FIGS. 6 and 7 show the seat 12 in its highest and lowest positions, respectively, the protective assembly 10 does not limit the range of motion of the seat 12 as shown because there is additional space in the rings 44 for the pin 48 to translate. For example, as shown in FIG. 6, if the structure of the seat 12, the track 18 and the vertical adjustment mechanisms 26 permit the seat 12 to be moved to a higher position, the intermediate segment 32 can be rotated to a vertical position, and the hinge pin 48 can translate to the top of the elongated slots 46 of the rings 44 on the intermediate segment 32 and the bottom of the elongated slots 46 of the rings 44 on the second segment 34.

Figure 8:
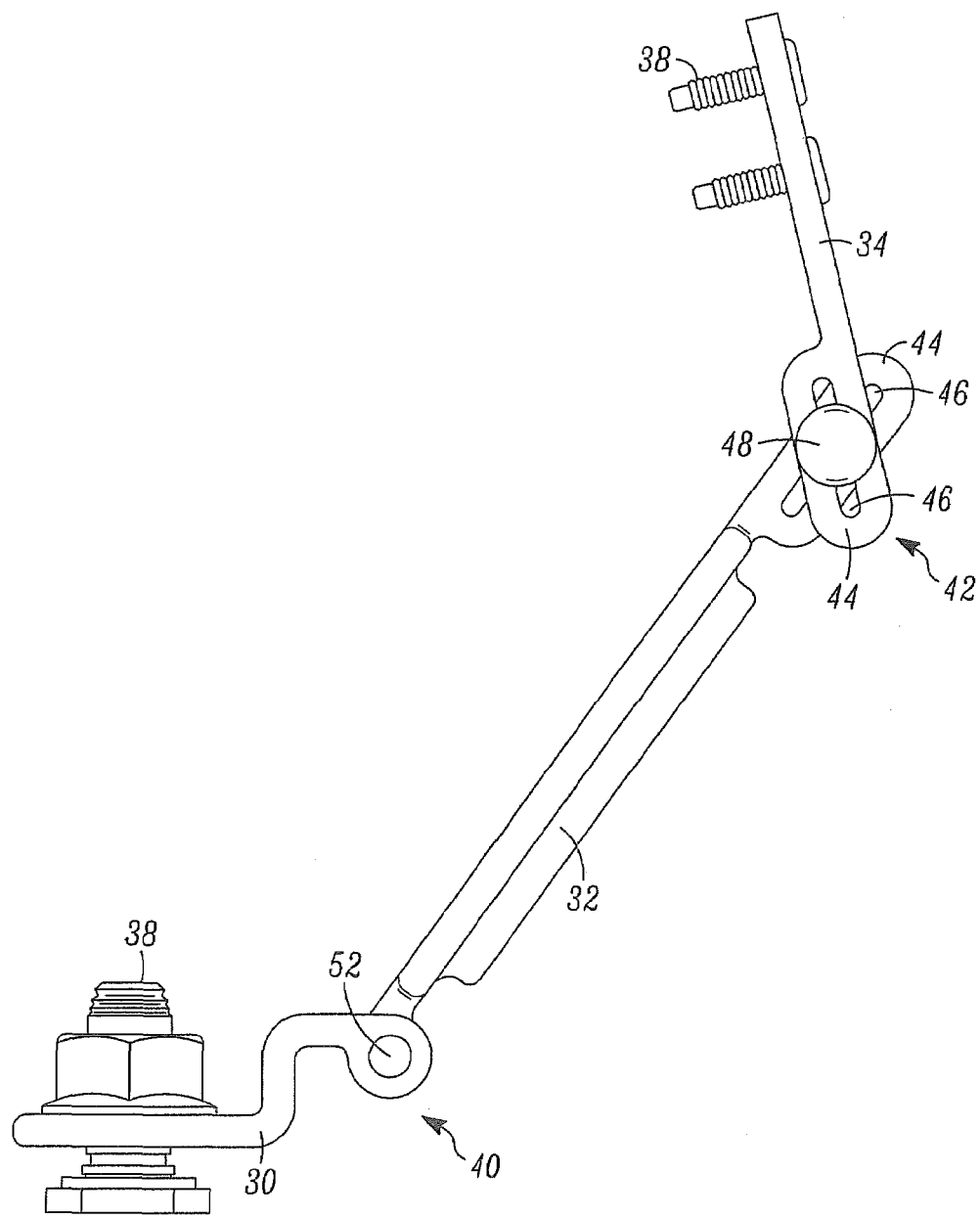
FIG. 8 is a side elevation of the guard member as shown in FIG. 6.
Figure 9:
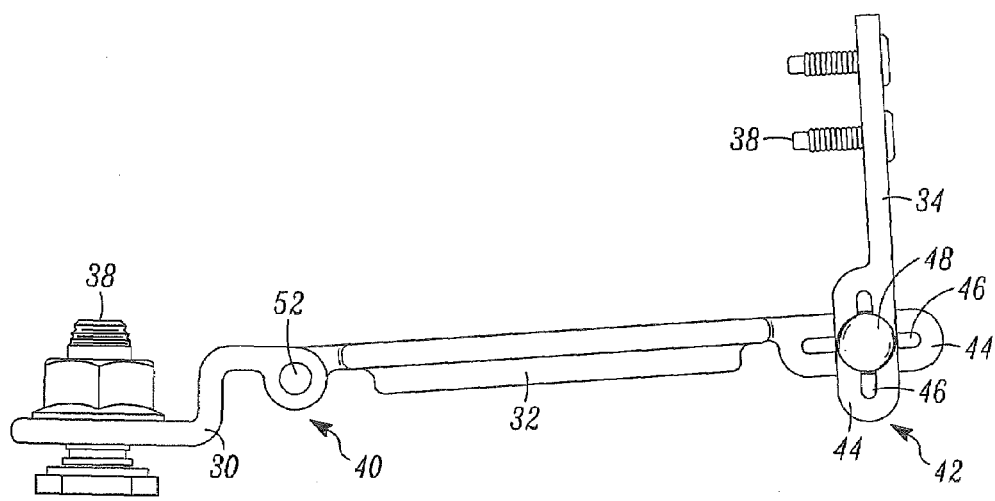
FIG. 9 is an enlarged side elevation of the guard member as shown in FIG. 7.

FIGS. 8 and 9 illustrate the protective assembly 10 in the same positions as shown in FIGS. 6 and 7, respectively. The first segment 30 is illustrated including a fastener 38 that rigidly attaches the first segment 30 to the track 18. The fastener 38 can travel all the way through the lower rail 20 to attach the supporting structure 16 to the floor 22 to reduce the number of fasteners 38 required to hold the seat 12 and protective assembly 10 in place. Alternatively, separate fasteners 38 could be used to secure the first segment 30 to the track 18 and the track 18 to the floor 22. Additional fasteners 38 can attach the track 18 to the floor 22 in other locations. The second segment 34 is also shown with fasteners 38 to rigidly attach the second segment 34 to the seat 12. The first and second segments 30, 34 can be rigidly fixed to the lower rail 20 and seat 12, respectively, in alternative manners. For example, the segments 30, 34 could be formed integrally with a part of the track 18 and the frame 28 of the seat 12, respectively. Alternatively, the segments 30, 34 could be glued, welded or snap-fit to the track 18 and the seat 12, or rigidly connected in any other way understood to be acceptable by those skilled in the art when this description is read in conjunction with viewing the accompanying drawings.

Figure 10:
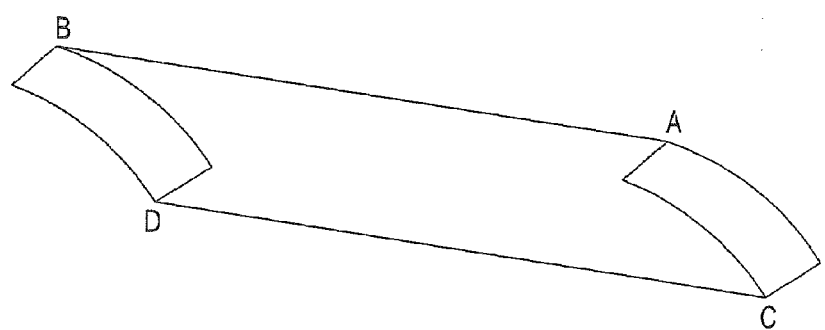
FIG. 10 is a schematic diagram showing the range of motion of the first hinge pin.
Figure 11:
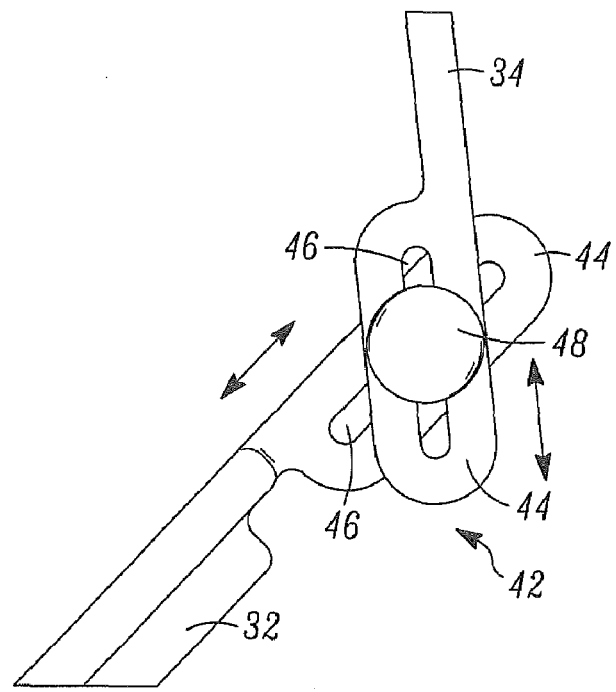
FIG. 11 is an enlarged side elevation of the guard member as shown in FIG. 6.
Figure 12:
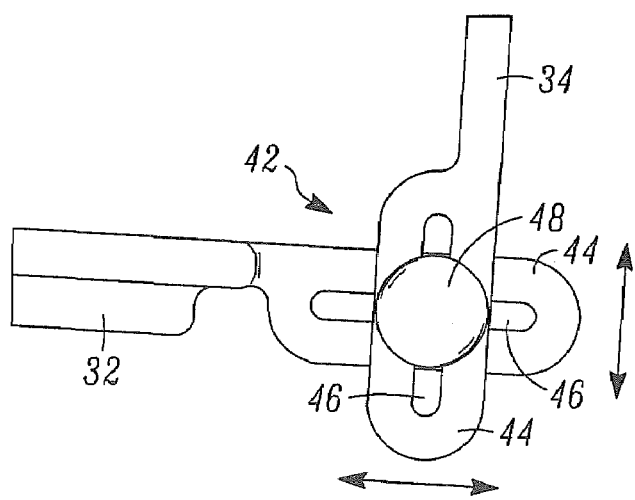
FIG. 12 is an enlarged side elevation of the guard member as shown in FIG. 7.

FIG. 10 illustrates the range of motion of the hinge pin 48 in the second hinge 42 as illustrated in FIG. 4. The range of motion of hinge pins 48 in other embodiments is similar to the illustrated range of motion, though it may vary depending on how many hinges include rings 44. When the seat 12 is at its lowest and furthest aft position, the hinge pin 48 is at position C. Raising the seat 12 to its maximum height moves the hinge pin 48 to position A. The curved rectangle between positions A and C represents the possible positioning of the hinge pin 48, which can translate in the elongated slots 46 of the rings 44 in the hinge 42, when the upper rail 24 is in its furthest aft position. Thus, the size of the rectangle depends on the length of the elongated slots 46 and the number of hinges with rings 44 in the assembly 10. From the highest and furthest back position A, the seat 12 can be moved forward to its highest and most forward position B by moving the upper rail 24 as far forward as possible. From position B, the seat 12 can be moved further forward even though the upper rail 24 is at its furthest forward position by lowering the seat 12 using the vertical adjustment mechanism 26, as lowering the seat 12 allows the hinge pin 48 to translate forward in the elongated slots 46. The curved rectangle between positions B and D represents the possible range of movement of the hinge pin 48 when the upper rail 24 is at its furthest forward position. The seat 12 can be moved to its lowest position from position B to position the hinge pin 48 at position D, then the upper rail 24 can be moved as far aft as possible to position the hinge pin 48 at the starting point, position C.

The protective assembly 10 provides multiple advantages over known decorative covers. The intermediate segment 32 protects the space between the seat 12 and the track 18 to prevent objects, such as the foot of a passenger, from being inserted into the space instead of merely hiding the space from sight. The configuration of the rings 44 allows the intermediate segment 32 to extend between the seat 12 and the track 18 regardless of the position of the seat 12, thereby providing protection throughout the range of motion of the seat 12. The intermediate segment 32 can be rigid, in which case an object such as the foot of a passenger can not bend the segment 32 to insert an object into the space.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seat assembly for a vehicle, comprising:
    a seat;
    a track having a lower rail fixed to the floor of the vehicle and an upper rail slidably coupled to the lower rail;
    a vertical adjustment mechanism mounted to the upper rail and the seat and configured to move the seat vertically relative to the upper rail;
    a guard member having a first segment fixed to one of the vehicle floor and the track, a second segment fixed to the seat, and an intermediate segment, the guard member having a first hinge pivotally coupling the first segment to the intermediate segment and a second hinge pivotally coupling the intermediate segment to the second segment,
    wherein the intermediate member is configured and arranged to span the distance between the seat and the track and prevent access to a space between the seat and the track; and
    wherein the second hinge includes a hinge pin defining a hinge axis, wherein at least one of the intermediate member and second member is configured so that the position of the hinge pin can be translated along a direction that is perpendicular to the hinge axis.

2. The seat assembly of claim 1, wherein the intermediate member is composed of a rigid material.

3. A protective assembly for a seat installed on the floor of a vehicle having a frame, an adjustment mechanism to move the seat vertically relative to the floor of the vehicle, and a support structure coupling the seat to the floor, comprising:
    a first segment fixed to the support structure;
    an intermediate segment;
    a second segment fixed to the seat;
    a first hinge coupling the first segment to the intermediate segment; and
    a second hinge coupling the intermediate segment to the second segment;
    wherein, at least a portion of the intermediate member is interposed between the seat and the support structure of the vehicle to prevent access to a space between the seat and the support structure; and
    wherein at least one of the first and second hinges includes a first hinge pin defining a hinge axis, and at least one ring forming an elongated slot having a longitudinal axis substantially perpendicular to the hinge axis, the first hinge pin being inserted through the at least one ring to permit the hinge axis to move translationally within the slot when the adjustment mechanism moves the seat vertically relative to the floor of the vehicle.

4. The protective assembly of claim 3, wherein the second segment is rigidly fixed to the frame of the seat.

5. The protective assembly of claim 3, wherein the second hinge includes a first plurality of spaced-apart rings fixed to the intermediate segment, such that each of the first plurality of spaced-apart rings defines an elongated slot having a longitudinal axis substantially perpendicular to the hinge pin; and
    a second plurality of spaced-apart rings fixed to the second segment, such that each of the second plurality of spaced-apart rings defines an elongated slot having a longitudinal axis substantially perpendicular to the hinge pin.

6. The protective assembly of claim 3, wherein the intermediate member is configured and arranged to span a distance between the seat and the support structure when the vertical adjustment mechanism moves the seat to an uppermost vertical position relative to the vehicle floor.

7. The protective assembly of claim 3, wherein the intermediate member is composed of a rigid material.

8. The protective assembly of claim 3, wherein the support structure includes a track fixedly mounted to the vehicle floor and having an upper rail and a lower rail.

9. The protective assembly of claim 8, wherein the lower rail is coupled to the vehicle floor by a first fastener.

10. The protective assembly of claim 9, wherein the first segment is coupled to the lower rail by the first fastener.

11. The protective assembly of claim 9, wherein the lower rail is further coupled to the floor by a second fastener; and
    wherein the intermediate segment defines an aperture configured and arranged to receive the second fastener.

12. A seat assembly for a vehicle, comprising:
    a seat;
    a track having a lower rail fixed to the floor of the vehicle and an upper rail slidably coupled to the lower rail, the track configured and arranged to move the seat longitudinally with respect to the vehicle;
    a vertical adjustment mechanism coupled to the upper rail and the seat and configured and arranged to move the seat vertically relative to the upper rail;
    a guard member having a first segment fixed to one of the vehicle floor and the track, and a second segment fixed to the seat, and an intermediate segment, the guard member having a first hinge pivotally coupling the first segment to the intermediate segment and a second hinge pivotally coupling the intermediate segment to the second segment, at least one of the first and second hinges including a hinge pin defining a hinge axis and at least one ring defining an elongated slot having a longitudinal axis that is substantially perpendicular to the hinge axis, wherein the hinge pin is inserted through the slot to permit the hinge axis to move translationally along the elongated slot.

13. The seat assembly of claim 12, wherein the vertical adjustment mechanism comprises independently operable front and rear vertical adjustment mechanisms to permit the seat to tilt about a lateral axis.

14. The seat assembly of claim 12, wherein the second hinge includes the hinge pin and a first plurality of spaced-apart rings defined by the intermediate segment, such that each of the plurality of spaced-apart rings defines an elongated slot having a longitudinal axis substantially perpendicular to the hinge axis; and a second plurality of spaced-apart rings defined by the second segment, such that each of the plurality of spaced-apart rings defines an elongated slot having a longitudinal axis substantially perpendicular to the hinge axis; wherein the hinge pin is inserted through each of the first and second plurality of rings.

15. The seat assembly of claim 12, wherein the lower rail is coupled to the vehicle floor by a fastener, and wherein the first segment is coupled to the lower rail by the fastener.

16. The seat assembly of claim 12, wherein the second segment is rigidly fixed to the seat.

17. The seat assembly of claim 12, wherein the intermediate member is configured and arranged to span a distance between the seat and the track when the vertical adjustment mechanism moves the seat to an uppermost vertical position relative to the track.

18. The seat assembly of claim 12, wherein the intermediate member is composed of a rigid material.

19. The seat assembly of claim 12, wherein the track is coupled to the floor by a fastener, and wherein the intermediate member defines an aperture configured and arranged to receive the fastener.

* * * * *